May 19, 1931.    P. E. BUNET    1,806,386

ROTARY FREQUENCY TRANSFORMER

Filed May 25 1928

Inventor:-
Paul Emmanuel Bunet

Patented May 19, 1931

1,806,386

UNITED STATES PATENT OFFICE

PAUL EMMANUEL BUNET, OF VERSAILLES, FRANCE, ASSIGNOR OF ONE-HALF TO SOCIÉTÉ ACIERIES DE GENNEVILLIERS, OF GENNEVILLIERS, FRANCE, A CORPORATION OF FRANCE

ROTARY FREQUENCY TRANSFORMER

Application filed May 25, 1928, Serial No. 280,583, and in France June 2, 1927.

My invention relates to dynamo electric machines and particularly to an improvement of special character.

As is known in the art, a standard type of alternator is composed of an inducing member forming a certain number of poles which are alternatively north and south, excited by a direct current winding, and a second member in which are produced alternating electromotive forces having a frequency corresponding to the number of poles and the relative speed of the two members.

The alternating electromotive forces become developed in single or polyphase windings placed in slots provided in the second member opposite the pole faces of the first. As is likewise known to those skilled in the art, the teeth which lie between said slots tend to produce harmonic electromotive forces whose frequency depends upon the number of slots. In general the production of these harmonics is avoided as much as possible with a view to obtaining pure electromotive forces.

I have discovered that instead of preventing the production of these harmonic electromotive forces, I am able to develop them by suitable means in such a manner that the machine in question transforms the fundamental frequency into harmonic polyphased frequencies of a high order constituting the main object of my invention. More particularly, according to my invention, I form slots on the periphery of each pole, the pitch of said slots being equal to that of the slots of the stator; the teeth, thus formed between the slots, are distributed in each pole in several regions so that in each of these regions the relative positions of the teeth and slots of the rotor and stator are identical every moment and that in the other regions, the teeth and the slots of these two parts are deprived of a value equal to the pitch of the teeth divided by the number of regions. The windings placed around teeth of the pole pieces are then the seat of the polyphase electromotive forces of high frequency, the number of phases corresponding to the number of regions. I can again dispose slots, but not in the same way as the slots of the stator, on the pole pieces in such a manner that in the case of two successive poles, the teeth of one pole are opposite the teeth of the stator and the teeth of the other pole are opposite the slots of the stator. Windings placed around teeth of the poles are then the seat of two-phase electromotive forces with high frequency. In view of these means, the total reduction of the magnetic circuit of the machine is kept constant every moment.

My invention will be more readily understood with reference to the accompanying drawings forming part of this specification and in which—

Figure 1:
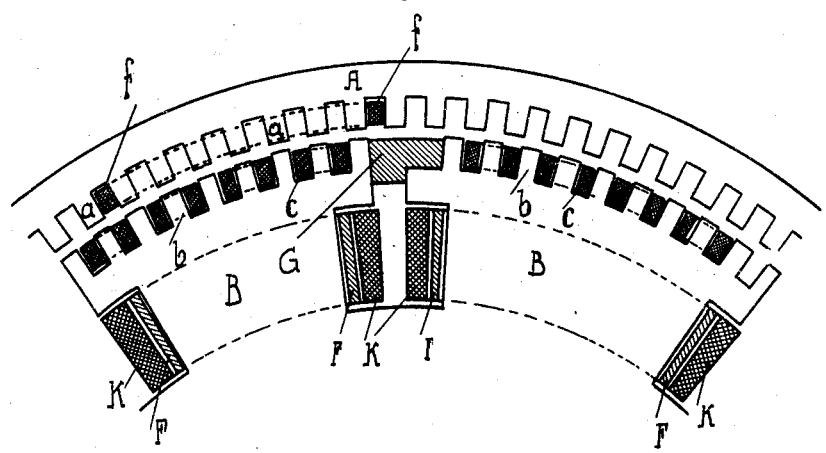
Fig. 1 is a partial diagrammatic section through a rotary frequency transformer with a two-phase feature of my invention applied.

Referring to Figure 1, the pole faces of the rotary inductor B of a standard alternator are provided with teeth $b$ like the teeth $a$ in the periphery of the stator A. The inductor B is excited by windings K traversed by direct current, each of said windings being disposed about a field pole of the inductor in a manner well known in the art.

The slots occurring between the teeth $a$ of stator A are provided with windings disposed in slots $f$ $f$ whose separation is equal to the pole pitch of member B or to a fractional pitch thereof in a manner well known in the art. The windings $f$ give electromotive forces of a frequency dependent upon the number of poles of member B.

Around the teeth $b$ in member B I dispose windings $c$ which produce electromotive forces of a frequency corresponding to the number of teeth provided in the pole faces of member B.

In order to eliminate considerable variation in flux due to the passage of teeth which would induce electromotive forces in both windings K and $f$ and thereby produce power losses due to the variation in flux produced throughout the magnetic circuit I preferably arrange the teeth $b$ of successive poles of member B alternatively falling opposite notches and teeth of member A. In the slots of the pole faces of member B which fall opposite a tooth $a$ is provided a second winding $c^1$. Said windings $c$ and $c^1$ are connected together in a manner well known in the art to give two two-phase systems of high frequency.

Figure 2:
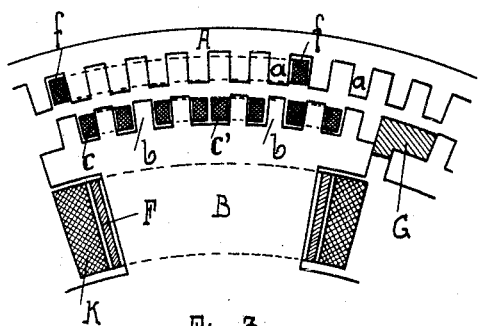
Fig. 2 is a similar view illustrating a modified two-phase feature of my invention.

Instead of providing the slots in successive poles as disclosed in connection with Fig. 1, I may dispose the arrangement of the slots of member B in the same pole thereof as shown in Fig. 2 wherein the slots falling to the left and right of the axis of a pole member in rotor B are displaced a distance of one-half of a tooth or slot successively. The windings $c$ and $c^1$ provided in the same pole of member B will be a source of electromotive forces of very high frequency. The successive poles of member B may all be the same, that is, able to be superposed by rotation, or similar only for a certain number, the rest being symmetrical and not able to be superposed by rotation. As concerns the teeth and notches, for certain poles of member B, they may lie as shown in Fig. 2 whereas for others at the same instant there may be teeth opposite teeth to the right of the axis of the pole and teeth opposite slots to the left thereof with respect to member A.

The flux issuing from B distributes itself over the teeth in accordance with the respective reluctances. On the left this reluctance is a minimum and on the right it is a maximum. It is therefore possible to arrange the parts so that the total reluctance remains approximately constant but that the flux is very low on the right and very high on the left. When the inductor and the stator are given a relative displacement of one-half of a tooth, the contrary will be the case.

In some cases I may place the windings $f\,f$ about the teeth $a$ for generating high frequency electromotive forces and I may also connect such windings in series or in series-parallel groups in such a way as to constitute a single high frequency single-phase circuit.

Finally, instead of providing two zones of slots over the pole face, there may be formed three or more of them with suitable angular offsetting, with collection of three-phase or higher polyphase electromotive forces, combined or not in simple single-phase circuits.

Figure 3:
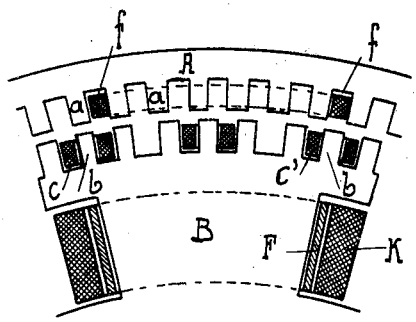
Fig. 3 is a similar view of a three-phase feature thereof.

Such an arrangement is shown in Fig. 3 in which I have provided three groups of slots and teeth in member B. In the embodiment the teeth of successive groups are displaced with respect to those of member $a$ a distance of 1/3 the distance between the axes of two successive teeth of member A. The same principle might obviously be carried out for any number of phases.

I preferably add to the machine suitable damping means of any type known in the art suitable to the construction thereof. These dampers may take two forms comprising closed magnetic circuits either surrounding the pole face as shown at G in Fig. 1 or as shown in Fig. 2, adjacent the exciting winding K of the pole.

What I claim is:

1. A rotary transformer for obtaining high frequency polyphased current comprising a circumferentially and uniformly slotted stator, a series of field poles rotatable relative to the stator, an inducing winding in said stator, an exciting winding for each of the field poles, slots having the same pitch as the stator slots provided in the face of each of the said field poles, the said slots of the field poles being arranged in sets, the respective slots of the said successive sets of slots of the rotor being staggered with respect to each other by a distance equal to a whole number of pitches increased by a fraction equal to the pitch of the slots divided by the number of phases to be obtained, and high frequency windings provided in the slots of each set.

2. A rotary transformer for obtaining high frequency polyphased current comprising a circumferentially and uniformly slotted stator, a series of field poles rotatable relative to the stator, an inducing winding in said stator, an exciting winding for each of the field poles, slots having the same pitch as the stator slots provided in the face of each of the said field poles, the said slots of the field poles being arranged in sets, in each of the field poles, the respective slots of the said successive sets of slots of the rotor being staggered with respect to each other by a distance equal to a whole number of pitches increased by a fraction equal to the pitch of the slots divided by the number of phases to be obtained, and high frequency windings provided in the slots of each set.

3. A rotary transformer for obtaining high frequency polyphased current comprising a circumferentially and uniformly slotted stator, a series of field poles rotatable relative to the stator, an inducing winding in said stator, an exciting winding for each of the field poles, slots having the same pitch as the stator slots provided in the face of each of the said field poles, the said slots of the field poles being arranged in sets in adjacent field poles, the respective slots of the said successive sets of slots of the rotor being staggered with respect to each other by a distance equal to a whole number of pitches increased by a fraction equal to the pitch of the slots divided by the number of phases to be obtained, and high frequency windings provided in the slots of each set.

In testimony whereof I have signed my name to this specification.

PAUL EMMANUEL BUNET.